(12) United States Patent
Jeddeloh

(10) Patent No.: US 6,219,764 B1
(45) Date of Patent: *Apr. 17, 2001

(54) MEMORY PAGING CONTROL METHOD

(75) Inventor: Joseph M. Jeddeloh, Minneapolis, MN (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/128,403

(22) Filed: Aug. 3, 1998

(51) Int. Cl.[7] .................................................. G06F 13/16

(52) U.S. Cl. ........................................ 711/154; 711/105

(58) Field of Search .................................. 711/104, 105, 711/106, 154, 170; 365/238.5

(56) References Cited

U.S. PATENT DOCUMENTS 5,664,153 * 9/1997 Farrell ................................. 711/154
5,893,917 * 4/1999 Derr ................................... 711/105

OTHER PUBLICATIONS

Shanley, Tom, and Don Anderson, *ISA System Architecture*, Addison–Wesley Publishing Company, 1995, Chap. 13, "RAM Memory: Theory of Operation," pp. 235–272. (+ Table of Contents).

* cited by examiner

*Primary Examiner*—Kevin L. Ellis
(74) *Attorney, Agent, or Firm*—Dorsey & Whitney LLP

(57) ABSTRACT

A method is described for controlling data transfer operations between a memory having a plurality of addressable pages and a device operable to write data to and read data from the memory. An address is stored that corresponds with an open page in the memory. A read or write request is received from the device, together with an address corresponding with the requested page from or to which the read or write is to be performed. The requested page address is compared with the stored open page address to determine whether the requested page is already open. The appropriate sequence of memory operations is then initiated to effect the requested read or write data transfer. If a read request, the requested memory page is left open after completion of data transfer operations. If a write request, the requested memory page is closed and precharged following completion of the data transfer operations.

9 Claims, 4 Drawing Sheets

MEMORY PAGING CONTROL METHOD

TECHNICAL FIELD

The present invention relates generally to circuitry and protocols associated with operating a memory device, and more particularly, to methods for controlling paging operations in a memory device.

BACKGROUND OF THE INVENTION

FIG. 1 is a simplified functional diagram of a memory device 200 that represents any of a wide variety of currently available memory devices. The central memory storage unit of the memory device 200 is a memory array 202 which is typically arranged in a plurality of banks, with two such banks 204A and 204B shown in the Figure. The memory array 202 includes a plurality of individual memory elements (not shown) for storing data, with the memory elements typically arranged in separately addressable rows and columns. Those skilled in the art oftentimes refer to a collectively addressable subset of the array 202 as a "page." Typically, a single row of memory elements in a bank of the array constitutes a particular page. In FIG. 1, a plurality of pages 206A and 206B are depicted, corresponding with banks 204A and 204B, respectively.

As known to those skilled in the art, particular locations within the memory array 202 are addressable by Address signals that external circuitry (not shown) provides to the memory device 200. Also, external circuitry provides a plurality of Control or command signals that are used to designate the particular memory access type and/or sequence of memory accesses. As depicted in FIG. 1, a control/address logic circuit 208 receives the Control signals and Address signals, which may be provided in parallel signal paths, serially, or some combination. The control/address logic circuit 208 then applies a plurality of internal control signals to control the timing and sequence of operations accessing the banks 204A and 204B via access circuits 210A and 210B, respectively. Those skilled in the art will understand that the depicted access circuits 210A and 210B represent a collection of various functional circuit components commonly found in memory devices. Examples include row and column address latch, buffer, and decoder circuits, sense amplifiers and I/O gating circuitry, and other well-known circuits adapted for particular memory device implementations. Data written to and read from the memory array 202 is transferred from and to external circuitry via a data I/O circuit 212 and the access circuits 210A and 210B.

When access to a particular memory page is complete, and the memory page is then "closed," a precharge operation is performed to prepare the memory device for a subsequent memory access. The precharge operation requires a certain amount of time for its completion, and therefore limits the speed with which a sequence of memory operations can be performed. By organizing the memory array 202 to have multiple banks 204A and 204B with associated multiple access circuits 210A and 210B, the precharge time can, in some instances, be "hidden." For example, if a first memory access is to bank 204A, and a subsequent memory access is to bank 204B, precharge operations associated with bank 204A can occur while initiating memory access operations to bank 204B. However, successive memory access operations to a single bank still result in precharge time intervals during which memory access operations cannot be performed.

Some attempts have been made to minimize those data transfer interruptions caused by precharge time intervals. By leaving a page "open" after completing a memory access operation to that page, the precharge time penalty is avoided when a subsequent bank access is to that very same page (a "page hit"). However, when a subsequent bank access is to a different page (a "page miss"), the open page must then be closed and the precharge operation performed before memory access operations can proceed. Therefore, while there exist benefits to leaving a page open in the event there are frequent page hits, there exist significant time penalties associated with a large number of page misses.

SUMMARY OF THE INVENTION

In accordance with the present invention, a method is provided for controlling data transfer operations between a memory and a device operable to write data to and read data from the memory, in which the memory is organized as a plurality of pages. An address is stored that corresponds with an open page in the memory. A data transfer request is received, as is an address corresponding with the requested page to or from which the data transfer is to be performed. The requested page address is compared with the stored page address to determine whether the requested page is already open. If the requested page is open, data transfer operations between the device and the requested memory page are initiated. If the requested memory page is closed, the requested memory page is first opened and the data transfer operations are then initiated. If the requested data transfer is a read request, the requested memory page is left open after completion of data transfer operations. If the requested data transfer is a write request, the requested memory page is closed following completion of the data transfer operations.

DETAILED DESCRIPTION

The following describes a novel method for controlling data transfer operations between a memory and a device in, for example, a computer system. Certain details are set forth to provide a sufficient understanding of the present invention. However, it will be clear to one skilled in the art, that the present invention may be practiced without these particular details. In other instances, well-known circuits, control signals, timing protocols, and software operations have not been shown in detail in order to avoid unnecessarily obscuring the invention.

Figure 2:
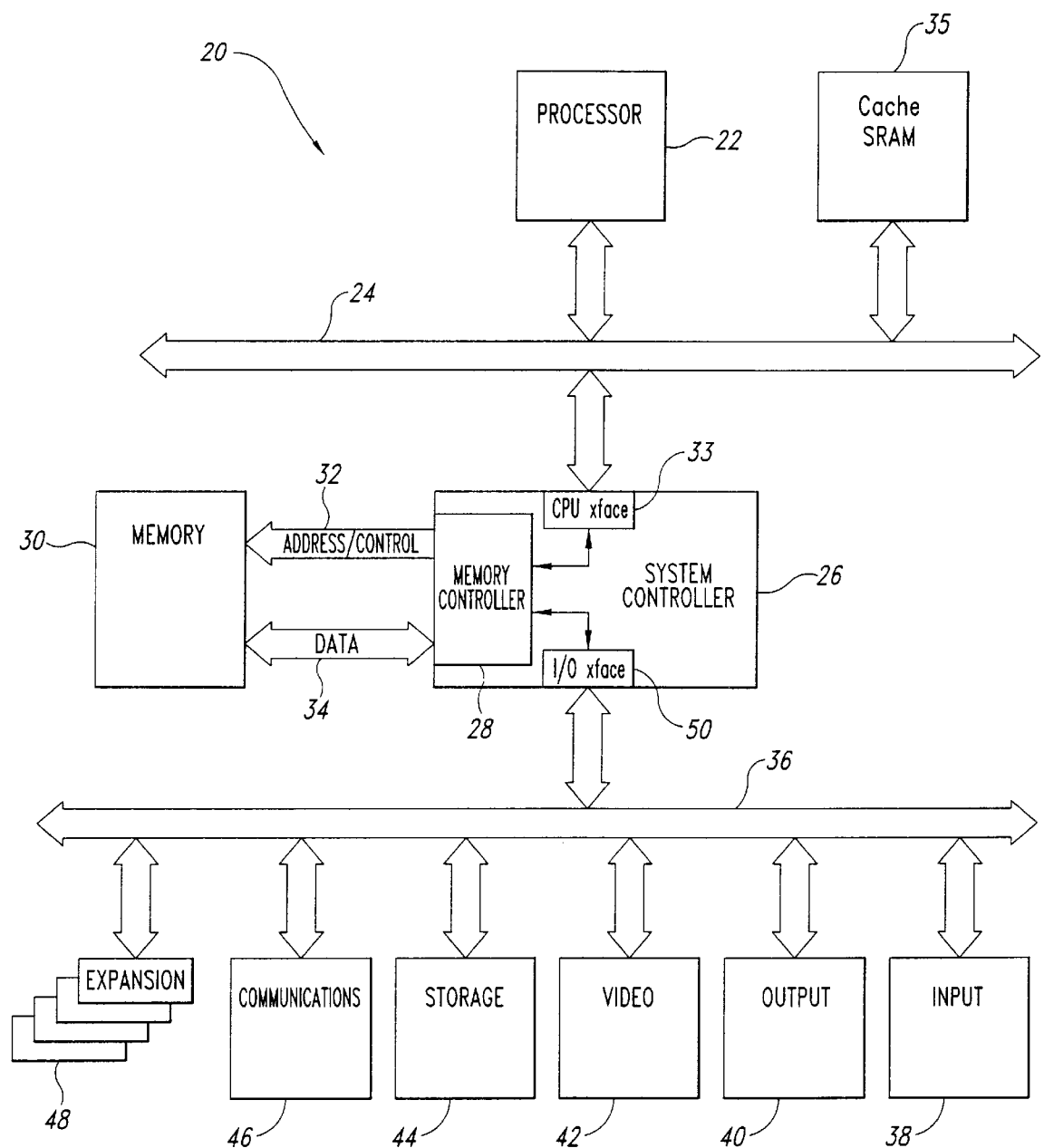
FIG. 2 is a functional block diagram of a computer system adapted to perform a method in accordance with an embodiment of the present invention.

FIG. 2 shows a computer system 20 that is adapted to perform a method in accordance with an embodiment of the present invention. A central processing unit (CPU), such as a microprocessor 22, is coupled with a system controller 26 by a processor bus 24 that carries address, data, and control signals therebetween. The system controller 26 includes a memory controller 28 for accessing a main memory 30 via a memory address/control bus 32 and a memory data bus 34.

As understood by those skilled in the art, the address/control bus 32 may itself be separate, parallel address and control signal paths, or the address and control information may be provided serially, or in some other suitable combination. The main memory 30 may include any of a wide variety of suitable memory devices. Example memory devices include dynamic random access memory (DRAM) devices such as synchronous DRAMs, SyncLink DRAMs, or RAMBUS DRAMs, and may include multiple separately addressable memory banks, as described above in connection with FIG. 1.

The system controller 26 includes CPU interface circuitry 33 that couples the microprocessor 22 with other components of the system controller, such as the memory controller 28. The system controller 26 also includes a cache controller (not shown) for controlling data transfer operations to a cache memory 35 that provides higher speed access to a subset of the information stored in the main memory 30.

The system controller 26 also functions as a bridge circuit (sometimes called a North bridge) between the processor bus 24 and a system bus, such as I/O bus 36. The I/O bus 36 may itself be a combination of one or more bus systems with associated interface circuitry (e.g., AGP bus and PCI bus with connected SCSI and ISA bus systems). Multiple I/O devices 38–46 are coupled with the I/O bus 36. A data input device 38, such as a keyboard, a mouse, etc., is coupled with the I/O bus 36. A data output device 40, such as a printer, is coupled with the I/O bus 36. A visual display device 42 is another data output device that is commonly coupled with the I/O bus 36. A data storage device 44, such as a disk drive, tape drive, CD-ROM drive, etc., is coupled with the I/O bus 36. A communications device 46, such as a modem, local area network (LAN) interface etc., is coupled with the I/O bus 36. Additionally, expansion slots 48 are provided for future accommodation of other I/O devices not selected during the original design of the computer system 20.

FIG. 2 depicts the various I/O devices 38–46 as being coupled with the system controller 26 via a single, shared I/O bus 36 and an I/O interface 50 integrated within the system controller. However, those skilled in the art will understand that one or more of the I/O devices 38–46 may have separately dedicated interface connections to the system controller 26, in which case the single depicted I/O interface 50 will be understood as a representation for a plurality of separately dedicated and adapted I/O interfaces. Alternatively, one or more of the I/O devices 38–46 may be coupled with the system controller 26 via a multiple bus and bridge network. As a further alternative, one or more of the I/O devices 38–46 may be coupled with the system controller 26 partly through a shared bus system and party through separately dedicated signal line connections. Indeed, those skilled in the art will understand the depiction of FIG. 2 to encompass any of a wide variety of suitable interconnection structures between the memory 30, the memory controller 28, and the I/O devices 38–46.

Figure 3:
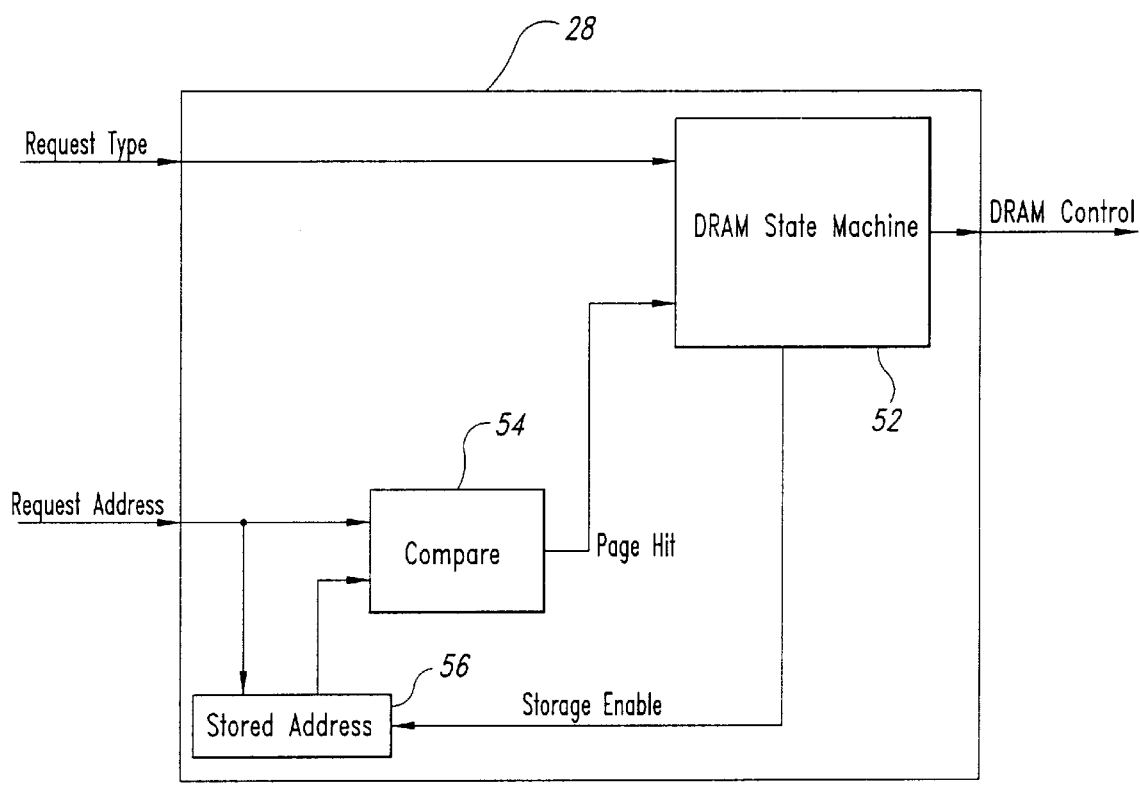
FIG. 3 is a functional block diagram depicting a portion of a memory controller included in the computer system of FIG. 2.

FIG. 3 is a functional block diagram depicting a portion of the memory controller 28. The memory controller 28 includes a DRAM state machine 52, which produces the well-known control signal sets and sequences to effect various memory access operations. Example control signals include the well known row address strobe (RAS), column address strobe (CAS), write enable (WE), and/or other memory control signals appropriate to the particular memory device or devices included within the main memory 30. The DRAM state machine 52 produces the appropriate set and sequence of control signals in response to receiving a Request Type signal. The Request Type signal has first and second states corresponding to requests for a read data transfer and write data transfer, respectively. A Request Address is also provided to the memory controller 28 and corresponds with a location in the main memory 30 (see FIG. 2) to or from which the write or read data transfer is to be performed. Both the Request Type signal and the Request Address are provided to the memory controller 28 by the CPU interface 33 or the I/O interface 50 in response to corresponding signals produced by the microprocessor 22 or one of the I/O devices 38-46 requesting the read or write operation (see FIG. 2).

The Request Address is received at one of two inputs to a comparator 54 included within the memory controller 28. The other of the comparator inputs receives a Stored Address from a page address register 56. The Stored Address corresponds to an open page in the main memory 30, and the comparator 54 produces a compare output signal having first and second states corresponding to whether the Request Address and the Stored Address match. A match of the Request Address and Stored Address constitutes a page hit, in which case the DRAM state machine 52 produces a set of control signals to initiate access to the already open page in the main memory 30, as will be understood to those skilled in the art. If, on the other hand, the Request Address and Stored Address do not match (i.e., a page miss), the comparator 54 produces a deasserted signal causing the DRAM state machine 52 to produce a sequence of control signals first opening the requested memory page and then initiating access to that page.

The page address register 56 receives the Request Address and updates the value of the Stored Address by selectively registering the Request Address in response to a Storage Enable signal produced by the DRAM state machine 52. In accordance with an embodiment of the present invention, the memory controller 28 provides a paging policy in which the memory page to which a read access has occurred is left open. Following a read access, the DRAM state machine 52 then asserts the Storage Enable signal to update the value stored in the page address register 56 to correspond with the Request Address to which the read operation was performed. Following a write access to a memory page, that memory page is closed and precharge operations are performed.

In a preferred embodiment, no more than a single memory page is open at any given time. Alternatively, multiple pages may be left open as long as no more than a single memory page is open in any one bank of the memory. If multiple pages are to be left open, the page address register 56 is then adapted to store multiple addresses, each corresponding with an open memory page in a respective memory bank. The comparator 54 is then also adapted to compare the Request Address to the multiple stored addresses to determine whether a page hit occurs.

Figure 4:
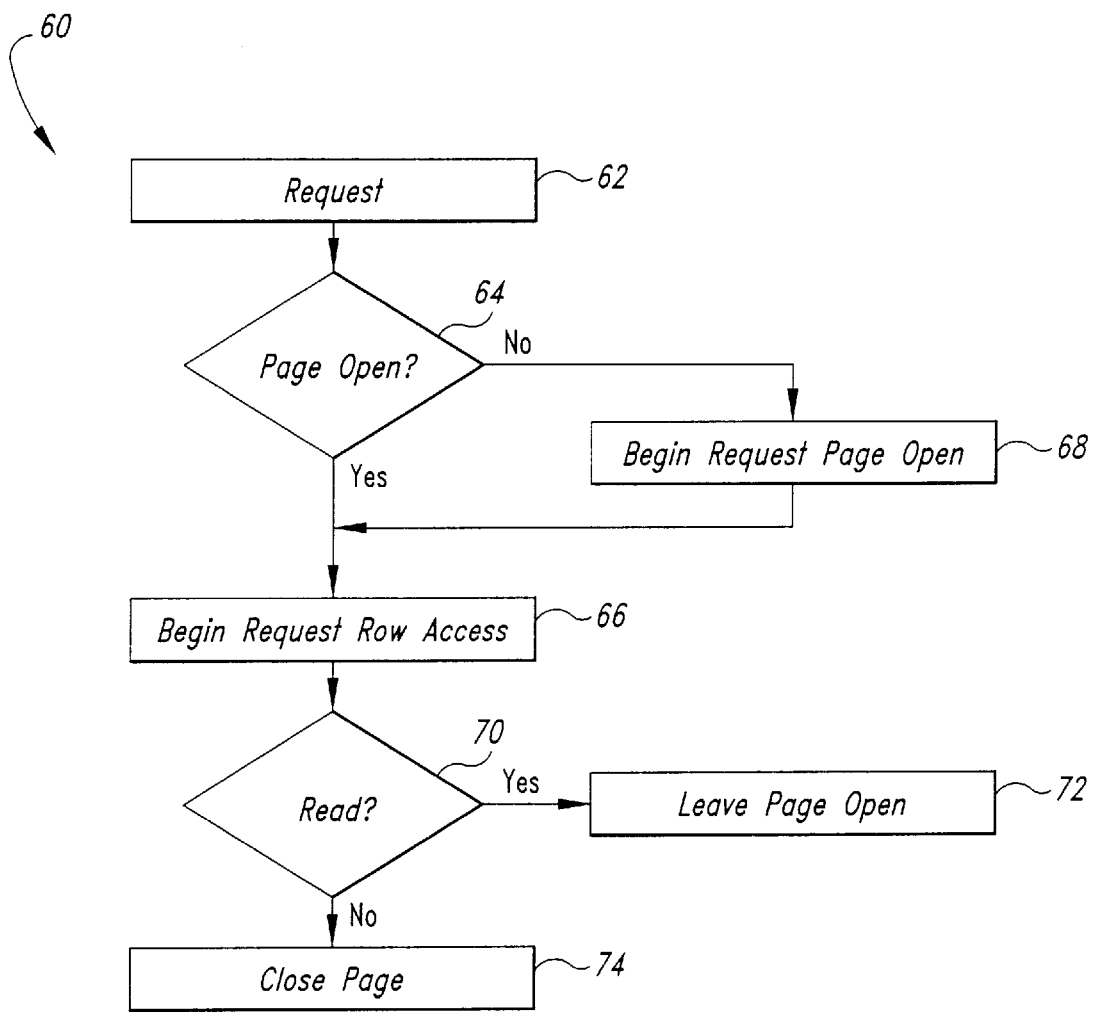
FIG. 4 is a process flow diagram depicting a method of operating a memory device in accordance with an embodiment of the present invention.

FIG. 4 is a process flow chart depicting a method 60 of operating a memory device in accordance with an embodiment of the present invention. A memory access Request is received at step 62, which includes both indication of the type (read or write) of memory access request together with a corresponding memory address. A conditional branch test is performed at step 64, in which it is determined whether the addressed memory page is already open. If the memory page is open, the requested memory access to that page is initiated in step 66. If the requested page is not open, the requested page is first opened at step 68, whereupon the process flow is routed to step 66 in which the requested access is performed to the now open page. A conditional branch test is performed in step 70 in which it is determined whether the Request is a read request. If the Request is a read, the accessed page is left open in step 72. However, if the requested access is not a read, the accessed page is then closed and precharge operations are performed in step 74.

Figure 1:
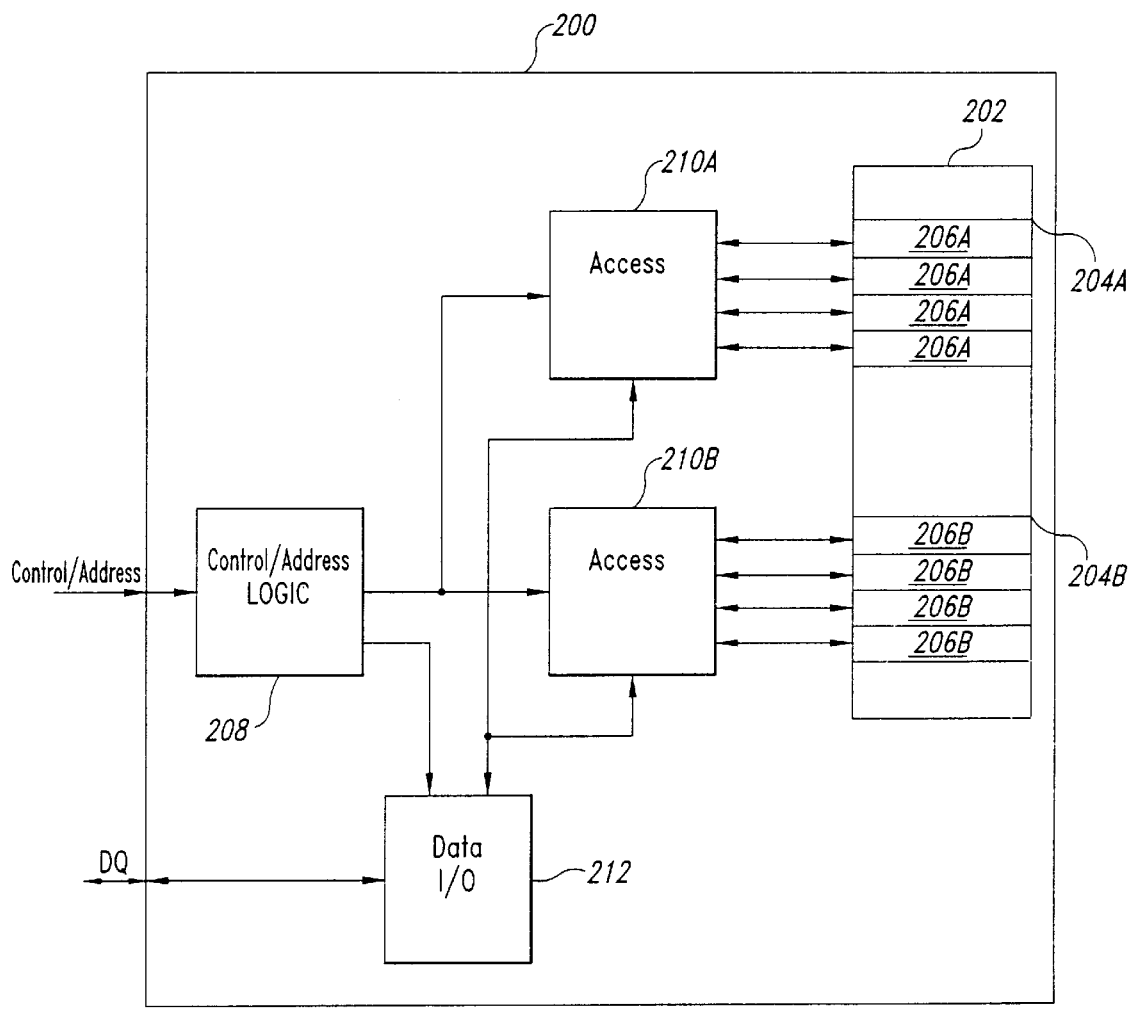
FIG. 1 is a functional block diagram of a memory device according to the prior art.

Each of the circuits whose function, method of operation, and interconnection is described in connection with FIGS. 1–3 is of a type known in the art. One skilled in the art will be readily able to adapt such circuits in the described combination to practice the present invention. The internal details of these particular circuits are not critical to the invention, and a detailed description of the internal circuit operation need not be provided. Similarly, each one of the process steps described in connection with FIG. 4 is of a type well known in the art, and may itself be a sequence of operations that need not be described in detail in order for one skilled in the art to practice the present invention.

A number of advantages are provided by the above-described embodiments of the present invention. Given that many read operations represent cache or buffer fill operations, the probability is relatively high that, following a given read operation, a next read operation will be performed to the same memory page. However, a subsequent read operation to another of the memory banks is relatively unlikely to be a page hit in that memory bank, and so the preferred embodiment keeps open only a single memory page. Significant precharge time penalties are then avoided except in the situation where a read page miss occurs in the bank having the open page. In the event a write access to a bank immediately follows a read access to that bank, the time penalty associated with precharge operations is still largely avoided. This is because write data can be latched into the memory device (see I/O circuit 212 of FIG. 1) even while precharge operations are performed at the array and associated access circuitry (see access circuits 210A and 210B of FIG. 1).

Most modern systems provide "read around write" capability and use write buffers to reorder and combine write operations to minimize the frequency of write operations to memory. Following completion of a given set of write operations, therefore, it is relatively improbable that a subsequent write operation will also be to the same page. Also, as described above, any precharge time penalties associated with subsequent write operations are minimal compared to those associated with subsequent read operations. Further, since write operations are typically combined in today's systems, it is most likely that a next operation will be a read operation, such as a code fetch to an area of memory not located in the page to which the previous write operation occurred. Therefore, embodiments of the present invention provide an optimal paging policy in which a memory page is left open only following a read access, while the memory page is closed and precharge operations are performed following a write access. These and other advantages will be appreciated by those skilled in the art.

From the foregoing it will be appreciated that, although specific embodiments of the invention have been described herein for purposes of illustration, various modifications may be made without deviating from the spirit and scope of the invention. Those skilled in the art will appreciate that many of the advantages associated with the circuits for performing the processes described above in connection with FIGS. 2–4 may be provided by other circuit configurations performing similar processes. Indeed, a number of suitable circuit components can be adapted and combined in a variety of circuit topologies to implement various methods of controlling memory device paging operations in accordance with the present invention. Accordingly, the invention is not limited by the disclosed embodiments, but instead the scope of the invention is determined by the following claims.

What is claimed is:

1. In a computer system having a memory with a plurality of memory pages and a device operable to write data to and read data from the memory, a method of controlling data transfer operations between the device and the memory, comprising:

receiving a data transfer request;

receiving an address corresponding with a requested one of the memory pages in the memory;

determining whether the requested memory page is open;

if the requested memory page is open, then initiating data transfer operations between the device and the requested memory page;

if the requested memory page is closed, then opening the requested memory page and subsequently initiating data transfer operations between the device and the requested memory page;

determining if the data transfer request is a read request; and if the data transfer request is a read request, then leaving the requested memory page open after completion of the data transfer operations;

if the data transfer request is not a read request, then closing the requested memory page after completion of the data transfer operations; and storing an address corresponding to an open memory page, and wherein determining whether the requested memory page is open includes comparing the address corresponding with the requested memory page to the stored address.

2. A method according to claim 1 wherein if the requested memory page is determined to be closed, the method then further comprises closing any one of the memory pages that is open.

3. A method according to claim 1 wherein if the requested memory page is left open, the method then further comprises storing the address corresponding with the requested memory page.

4. In a system having device operable to write data to and read data from a memory having a plurality of addressable memory pages, a method of controlling data transfer operations between the device and the memory, comprising:

storing an open page address corresponding to a memory page that is open;

receiving a write request or a read request indicating whether data is to be written to or read from the memory, respectively;

receiving a request page address corresponding with a requested memory page to or from which data is to be written or read;

comparing the request page address and the open page address to determine whether the requested memory page is open;

writing data to or reading data from the requested memory page as determined by the received write request or read request, respectively;

leaving the requested memory page open after data is read therefrom; and closing the requested memory page after data is written thereto.

5. A method according to claim 4 wherein if the read request is received, the method then further comprises modifying the stored open page address to correspond to the request page address.

6. In a computer system having a memory with a plurality of memory pages and a device operable to write data to and read data from the memory, a method of controlling data transfer operations between the device and the memory, comprising:

receiving a data transfer request;

receiving an address corresponding with a requested one of the memory pages in the memory;

determining whether the requested memory page is open;

if the requested memory page is open, then initiating data transfer operations between the device and the requested memory page;

if the requested memory page is closed, then opening the requested memory page and subsequently initiating data transfer operations between the device and the requested memory page;

determining if the data transfer request is a read request; and if the data transfer request is a read request, then leaving the requested memory page open after completion of the data transfer operations; and if the data transfer request is not a read request, then closing the requested memory page after completion of the data transfer operations; and if the requested memory page is left open, the method then further comprises storing the address corresponding with the requested memory page.

7. The method of claim 6 wherein if the requested memory page is determined to be closed, the method then further comprises closing any one of the memory pages that is open.

8. In a computer system having a memory with a plurality of memory pages and a device operable to write data to and read data from the memory, a method of controlling data transfer operations between the device and the memory, comprising:

receiving a data transfer request;

receiving an address corresponding with a requested one of the memory pages in the memory;

determining whether the requested memory page is open;

if the requested memory page is open, then initiating data transfer operations between the device and the requested memory page;

if the requested memory page is closed, then opening the requested memory page and subsequently initiating data transfer operations between the device and the requested memory page;

determining if the data transfer request is a read request; and if the data transfer request is a read request, then leaving the requested memory page open after completion of the data transfer operations; and if the data transfer request is not a read request, then closing the requested memory page after completion of the data transfer operations; wherein if the requested memory page is left open, the method then further comprises storing the address corresponding with the requested memory page.

9. The method of claim 8 wherein if the requested memory page is determined to be closed, the method then further comprises closing any one of the memory pages that is open.

* * * * *